United States Patent

Grelat

[11] 3,720,678

[45] March 13, 1973

[54] PROCESS FOR THE MANUFACTURE OF FLAVANTHRONES

[75] Inventor: Maurice Grelat, Bettingen, Switzerland

[73] Assignee: Ciba-Geigy AG, Basel, Switzerland

[22] Filed: Jan. 21, 1971

[21] Appl. No.: 108,602

[30] Foreign Application Priority Data

Feb. 11, 1970 Switzerland..........................1989/70

[52] U.S. Cl..............260/273, 260/247.7 H, 260/367
[51] Int. Cl. ..............................................C07d 39/00
[58] Field of Search.......................................260/273

[56] References Cited

UNITED STATES PATENTS

| | | | |
|---|---|---|---|
| 1,890,098 | 12/1932 | Smith et al. | 260/273 |
| 2,068,312 | 1/1937 | Dettwyler | 260/273 |
| 2,685,582 | 8/1954 | Coffey et al. | 260/273 |
| 1,714,249 | 5/1929 | Smith | 260/273 |
| 3,660,407 | 5/1972 | Kay | 260/273 |

FOREIGN PATENTS OR APPLICATIONS

| | | | |
|---|---|---|---|
| 2,949 | 8/1912 | Great Britain | 260/273 |
| 159,670 | 4/1933 | Switzerland | 260/273 |

*Primary Examiner*—Donald G. Daus
*Attorney*—Harry Goldsmith, Joseph G. Kolodny and Mario A. Monaco

[57] ABSTRACT

A process for the manufacture of flavanthrones, wherein a 1-halogeno-2-aminoanthraquinone is heated with copper powder in a strongly polar aprotic organic solvent.

10 Claims, No Drawings

PROCESS FOR THE MANUFACTURE OF FLAVANTHRONES

Various processes for the manufacture of flavanthrones are known. The technically most important include a process wherein β-aminoanthraquinone is heated with antimony pentachloride, and the Nawiasky process. The former simple process, however, only gives yields of below 30 percent and since the price of antimony pentachloride has greatly risen in recent times, this process has become uneconomical. In the Nawiasky process 1-chloro-2-aminoanthraquinone is acylated with phthalic anhydride to give 1-chloro-2-phthalimidanthraquinone, the latter is condensed in the presence of copper powder to give 2,2'-diphthalimido-1,1'-dianthraquinonyl, the phthaloyl radicals are removed by hydrolysis and the product obtained is cyclized to give the flavanthrone. Whilst this process gives good yields of flavanthrone, it requires three stages, starting from 1-chloro-2-aminoanthraquinone.

This invention is based on the observation that flavanthrones can be obtained in one stage by heating 1-halogeno-2-aminoanthraquinones with copper in a strongly polar, aprotic, organic solvent.

As starting materials, the 1-chloro-2-aminoanthraquinones are for example used, but especially the 1-bromo-2-aminoanthraquinones. These can also contain further substituents in the anthraquinone nucleus, for example halogen atoms or alkyl, alkoxy, aralkoxy or aryloxy groups. As examples there may be mentioned: 1-chloro-2-aminoanthraquinone, 1-bromo-2-aminoanthraquinoen, 2-amino-1,3-dibromoanthraquinone, 1-bromo-2-amino-3-methylanthraquinone, 1-bromo-2-amino-3-methoxyanthraquinone, 1-bromo-2-amino-3-benzyloxyanthraquinone and 1-bromo-2-amino-3-phenoxyanthraquinone.

Advantageously, an excess of copper is used, that is to say more than the theoretically required amount of 1 atom weight, and preferably at least 1.5 atom weights per mol of halogenoaminoanthraquinone, but the reaction takes place equally well with a greater excess of copper. The use of more than 2 atom weights however does not result in any increase in the yield and is therefore uneconomical.

The copper is advantageously present in powder form, the average particle size preferably not exceeding 25μ.

An aprotic solvent is to be understood as a solvent in which the molecules are not capable of releasing H ions (protons).

As examples water-soluble solvents may be especially mentioned, especially dimethylsulphoxide, as well as carboxylic acid amides of which the amide nitrogen atom is derived from a secondary amine, for example dimethylformamide, diethylformamide, dimethylacetamide, N-formylpiperidine, N-formylmorpholine, tetramethylurea and N-methylpyrrolidone; tetramethylenesulphone (sulpholane), hexamethylphosphoric acid triamide or ethylene carbonate may also be mentioned.

Preferably, 2 parts of the solvent are used for 1 part of the halogenoaminoanthraquinone.

The reaction temperature is advantageously between 50° and 160°C, especially between 50° and 100°C.

Since copper halides, which promote side-reactions, especially at higher temperatures, are produced during the reaction, the addition of a reducing agent can prove advantageous. As suitable reducing agents, polyhydroxybenzenes, for example hydroquinone, pyrocatechol, toluhydroquinone, pyrogallol, phloroglucinol or gallic acid may be especially mentioned, as well as 1,4-naphthohydroquinone-2-sulphonic acid or glucose.

As a rule, the flavanthrones are obtained directly as the end products of the process, since the 2,2'-diamino-1,1'-dianthraquinonyls which are transiently formed cyclise under the conditions of the reaction with elimination of water to give the flavanthrones, which owing to their insolubility in organic solvents can easily be isolated by filtration. The flavanthrones, which are obtained in good yield, are generally still contaminated with copper. To remove the copper, it is expedient to suspend the crude product in a dilute mineral acid and then treat it with an oxidizing agent, for example an alkali metal chlorate. The flavanthrones thus purified are outstandingly suitable both for use as vat dyestuffs and as pigments.

In the examples which follow the parts denote parts by weight and the percentages denote percentages by weight unless otherwise stated.

EXAMPLE 1

18 Parts of 1-bromo-2-aminoanthraquinone, 9 parts of copper powder and 100 parts of dimethylformamide are stirred for 3 hours at 120°C. The temperature is then raised to 145°C within half an hour, and the mixture is stirred for a further 30 minutes at this temperature. The reaction is diluted with 100 parts of dimethylformamide, the mixture is filtered hot, and the material on the filter is washed with warm dimethylformamide. The flavanthrone which contains copper is suspended in 500 parts of 20 percent hydrochloric acid. A solution of 20 parts of sodium chlorate in 100 parts of water is added dropwise to this suspension at 90°C and the whole is stirred for a further 2 hours at this temperature. The dyestuff is filtered and washed with water until neutral. After drying, flavanthrone is obtained in a yield of 80 percent.

EXAMPLE 2

Six parts of copper powder, 0.1 part of hydroquinone and 20 parts of dimethylsulphoxide are heated to 80°C whilst stirring. 10 Parts of 1-bromo-2-aminoanthraquinone and 0.4 part of hydroquinone are added at this temperature during 45 minutes. The mixture is stirred at 90° to 95°C for 2 hours. The crude flavanthrone is filtered hot and washed with warm dimethylsulphoxide.

The removal of copper is effected as described in Example 1, and the dyestuff is obtained in a yield of 85 percent.

The hydroquinone used in this reaction can be replaced by glucose without disadvantage.

EXAMPLE 3

Ten parts of 1-bromo-2-aminoanthraquinone, 2.1 parts of copper powder, 0.25 part of hydroquinone and 20 parts of N-methylpyrrolidone are stirred for 2 hours at 90° to 95°C and then for 3 hours at 110° to 115°C. The flavanthrone formed is filtered hot and washed with warm N-methylpyrrolidone. The flavanthrone which contains copper is reduced with 5 parts of sodium hydrosulphite at 50°C and the resulting blue solution is clarified by filtration. Oxidation of the vat with a sodium hypochlorite solution yields pure flavanthrone in good yield.

EXAMPLE 4

Ten parts of 1-bromo-2-aminoanthraquinone, 2.1 parts of copper powder, 0.25 part of hydroquinone and 20 parts of dimethylformamide are stirred for 2 hours at 90° to 95°C and then for 3 hours at 110° to 115°C. The crude flavanthrone formed is filtered and washed with warm dimethylformamide. Copper is removed as described in Example 1. The dyestuff is obtained in a yield of 80 percent.

EXAMPLE 5

3,3'-Dibromoflavanthrone

Sixty-three parts of 1,3-dibromo-2-aminoanthraquinone, 19 parts of copper powder and 180 parts of dimethylsulphoxide are heated to 55° to 60°C and stirred at this temperature for 1½ hours. The temperature is then raised to 100° to 105°C and the mixture is further stirred for 3½ hours. The crude dibromoflavanthrone is filtered whilst hot and washed with warm dimethylsulphoxide. Copper is removed as described in Example 1, and 3,3'-dibromoflavanthrone is obtained in a yield of 80 to 85 percent. Bromine content: 27.8 percent.

I claim:

1. A process for the manufacture of flavanthrones, wherein a 1-halogeno-2-aminoanthraquinone of the formula:

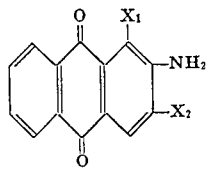

wherein $X_1$ is halogen and $X_2$ is hydrogen or halogen is heated with copper powder in a strongly polar aprotic organic solvent in the presence or absence of a reducing agent selected from the group consisting of polyhydroxybenzenes, 1, 4 naphthohydroquinone 2 sulfonic acid or glucose at a temperature from about 50°–160°C to directly convert said 1-halogeno-2-aminoanthraquinone to said corresponding flavanthrone.

2. A process as claimed in claim 1, wherein a 1-bromo-2-aminoanthraquinone is used as starting material.

3. A process as claimed in claim 1, wherein 1-bromo-2-aminoanthraquinone of the formula

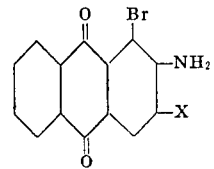

in which X is hydrogen or bromine, is used as starting material.

4. A process as claimed in claim 1, wherein dimethylsulphoxide is used as the solvent.

5. A process as claimed in claim 1, wherein a carboxylic acid amide in which the amide nitrogen atom is derived from a secondary amine is used as the solvent.

6. A process as claimed in claim 5, wherein dimethylformamide is used.

7. A process as claimed in claim 5, wherein N-methylpyrrolidone is used.

8. A process as claimed in claim 1, wherein the reaction is carried out at a temperature of from 50° to 100°C.

9. A process as claimed in claim 1, wherein at least 1.5 atom weights of copper are used for 1 mol weight of the 1-halogeno-2-aminoanthraquinone.

10. A process as claimed in claim 1, which is carried out in the presence of a reducing agent.

* * * * *